US012655673B2

(12) United States Patent
Dreyer

(10) Patent No.: US 12,655,673 B2
(45) Date of Patent: Jun. 16, 2026

(54) REVOLVING DOOR SYSTEM

(71) Applicant: Assa Abloy Entrance Systems AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 16 days.

(21) Appl. No.: 18/710,504

(22) PCT Filed: Nov. 22, 2022

(86) PCT No.: PCT/EP2022/082707
§ 371 (c)(1),
(2) Date: May 15, 2024

(87) PCT Pub. No.: WO2023/094343
PCT Pub. Date: Jun. 1, 2023

(65) Prior Publication Data
US 2025/0003281 A1 Jan. 2, 2025

(30) Foreign Application Priority Data
Nov. 23, 2021 (SE) .................................... 2130330-0

(51) Int. Cl.
*E05F 15/73* (2015.01)
*E05B 65/00* (2006.01)
(Continued)

(52) U.S. Cl.
CPC .......... *E05F 15/73* (2015.01); *E05B 65/0071* (2013.01); *E05F 15/608* (2015.01);
(Continued)

(58) Field of Classification Search
None
See application file for complete search history.

(56) References Cited

U.S. PATENT DOCUMENTS

| | | | |
|---|---|---|---|
| 4,458,447 | A | 7/1984 | Heise |
| 4,562,665 | A | 1/1986 | Blackston |

(Continued)

FOREIGN PATENT DOCUMENTS

| | | |
|---|---|---|
| EP | 0340771 | 11/1989 |
| WO | 8202224 | 7/1982 |

(Continued)

OTHER PUBLICATIONS

Written Opinion and International Search Report for PCT/EP2022/082707, completed Feb. 15, 2023.

(Continued)

*Primary Examiner* — Marcus Menezes
(74) *Attorney, Agent, or Firm* — Wissing Miller LLP

(57) ABSTRACT

Revolving door system (610) and method for controlling a revolving door system (610). The revolving door system (610) comprises a plurality of revolving door wings (D1, D2, D3, D4) pivotally connected a central column (690) and a securing mechanism arranged to in an engaged state fix the position of the revolving door wings (D1, D2, D3, D4) relative the central column (690) and in a disengaged state release the revolving door wings (D1, D2, D3, D4) to enable pivoting of said revolving door wings relative the central column (690).

17 Claims, 4 Drawing Sheets

(51) Int. Cl.
*E05F 15/608* (2015.01)
*E06B 3/90* (2006.01)
*E05B 47/00* (2006.01)

(52) U.S. Cl.
CPC ............ *E06B 3/90* (2013.01); *E05B 47/0046* (2013.01); *E05Y 2400/44* (2013.01); *E05Y 2900/132* (2013.01)

(56) References Cited

U.S. PATENT DOCUMENTS

| | | | | | |
|---|---|---|---|---|---|
| 4,847,485 | A * | 7/1989 | Koelsch | G07C 9/00 | 340/567 |
| 6,084,367 | A * | 7/2000 | Landert | E05F 15/608 | 318/283 |
| 8,868,299 | B2 * | 10/2014 | Kroemke | E05F 15/70 | 701/49 |
| 10,487,565 | B2 * | 11/2019 | Agam | G01S 7/4802 | |
| 2008/0244978 | A1 * | 10/2008 | Soyugenc | E05G 5/003 | 49/42 |
| 2019/0309560 | A1 | 10/2019 | Hall | | |

FOREIGN PATENT DOCUMENTS

| | | |
|---|---|---|
| WO | 2004101935 | 11/2004 |
| WO | 2019002062 | 1/2019 |

OTHER PUBLICATIONS

Swedish Search Report for SE Appl. No. 2130330-0, completed Jul. 7, 2022.

* cited by examiner

REVOLVING DOOR SYSTEM

This application is a 371 of PCT/EP2022/082707, filed on Nov. 22, 2022, published on Jun. 1, 2023, under publication number WO 2023/094343, which claims priority benefits from Swedish Patent Application No. 2130330-0, filed on Nov. 23, 2021, the disclosure of each of which are incorporated herein by reference.

TECHNICAL FIELD

Present invention relates to a revolving door system and a method for controlling a revolving door system.

BACKGROUND

Revolving doors are well known as an efficient door for allowing efficient passage of people into a building while avoiding draft. Buildings in need of being able to receive a large number of people, as e.g. stores, airports, etc. therefore often use revolving doors when they want to avoid draft from the passageways into the building through an outer wall of the building.

Many revolving doors are built to stop if someone pushes or touches a door wing of the revolving door to prevent accidents. In some cases, the revolving doors are configured to stop if a person or object is present in a set zone in front of the door wing. Such a zone may extend up to 20 centimeters in front of the door wing. When traffic of users through the revolving door gets too heavy, this function may result in the door for the most part not moving at all.

Commonly, revolving doors have three or four door wings and quite narrow compartments between the door wings. If one door wing faces an obstruction, all door wings stops.

This poses an issue in an emergency situation where a large number of people needs to pass through the revolving door quickly. To address this issue, revolving doors commonly have an emergency mode. In the emergency mode, the revolving door leafs are partially released from the central column allowing pedestrians to push the door leafs out of position to enable access and creating an escape route through the revolving door system.

To enable the emergency mode, the revolving door system is equipped with a holding mechanism for selectively fixating the door wings to the column. A first vertical edge of the revolving door leaf may accordingly be pivotally connected to the central column and a second, opposite, vertical edge may be connected to the holding mechanism. Upon release of the holding mechanism in the emergency mode, the revolving door leaf becomes pivotable relative the central column about the pivot connection between the first vertical edge and the central column. The holding mechanism may be mechanically, electrically or electromagnetically operated.

The emergency mode may be activated in different manners. In some systems, an escape push button is utilized. Upon pressing of the escape push button, the revolving door leafs are partially released from the central column allowing for the establishing of the escape route. In some systems, the emergency mode is a powerless mode, i.e. the emergency mode is initiated in response to the revolving door system not receiving any power. Thus, the emergency mode is activated in response to an emergency situation due to the emergency situation causing a loss in power. In some systems, the control system of the revolving door system may activate the emergency mode in response to an identified issue or error in the operation of the revolving door system.

An issue with such revolving door system is that it either requires manual operation of a button which is located outside of the revolving door system or that a power loss occurs in order for the emergency mode to be activated. The activation of the emergency mode is thus limited to only certain situations or requires the pedestrian to know the location and function of the escape push button.

There is thus a need for an improved revolving door better equipped to allow passage of pedestrians in an emergency situation.

SUMMARY

According to an aspect, a revolving door system is provided. The revolving door system comprises a plurality of revolving door wings connected to and arranged around a central column. The revolving door system further comprises a control arrangement. The control arrangement comprises an automatic door operator configured to cause movement of the revolving door wings in a rotation direction in a rotating state of the revolving door system between closed and opened positions.

The control arrangement further comprises a controller and a plurality of sensors, each sensor being connected to the controller and being configured to monitor a respective zone at the revolving door system for presence or activity of a person or object.

The revolving door system comprises a securing mechanism. The securing mechanism is operatively connected to the control arrangement. The securing mechanism is arranged to in an engaged state fix the position of the revolving door wings relative the central column. The securing mechanism is further arranged to in a disengaged state release the revolving door wings to enable pivoting of the revolving door wings relative the central column.

The revolving door system is configured to operate in a first mode wherein the securing mechanism is in the engaged state and a second mode wherein the securing mechanism is in the disengaged state.

The control arrangement is configured to cause switching from the first mode to the second mode at least based on sensor data obtained from at least one of the plurality of sensors.

According to an aspect, a revolving door system arrangement is provided. The revolving door system arrangement comprises a plurality of revolving door systems. Each of the plurality of revolving door systems comprises a communication interface. The communication interface is configured to receive historical operational data and/or sensor data from any one of the remaining revolving door systems of the revolving door system arrangement. The control arrangement of one of the revolving door systems is configured to cause switching from the first mode to the second mode based on the historical operational data of any one of the remaining revolving door systems and/or sensor data obtained from any one of the remaining revolving door systems.

According to an aspect, a method for controlling a revolving door system is provided. The revolving door system comprises a plurality of revolving door wings pivotally connected to and arranged around a central column and a control arrangement. The control arrangement comprises an automatic door operator configured to cause movement of the revolving door wings in a rotation direction in a rotating state of the revolving door system between closed and opened positions. The control arrangement comprises a controller and a plurality of sensors each sensor being connected to the controller and being configured to monitor a respective zone at the revolving system for presence or activity of a person or object. The revolving door system comprises a securing mechanism operatively connected to the control arrangement arranged to in an engaged state fix the position of the revolving door wings relative the central column and in a disengaged state release the revolving door wings to enable pivoting of said revolving door wings relative the central column.

The method comprises switches from a first mode of the revolving door system in which the securing mechanism is in the engaged state to a second mode in which the securing mechanism is in the disengaged state. The switching from said first mode to the said second mode is at least based on sensor data obtained from at least one of the plurality of sensors.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

Objects, features and advantages of embodiments of the invention will appear from the following detailed description, reference being made to the accompanying drawings.

DETAILED DESCRIPTION OF EMBODIMENTS

Figure 1:
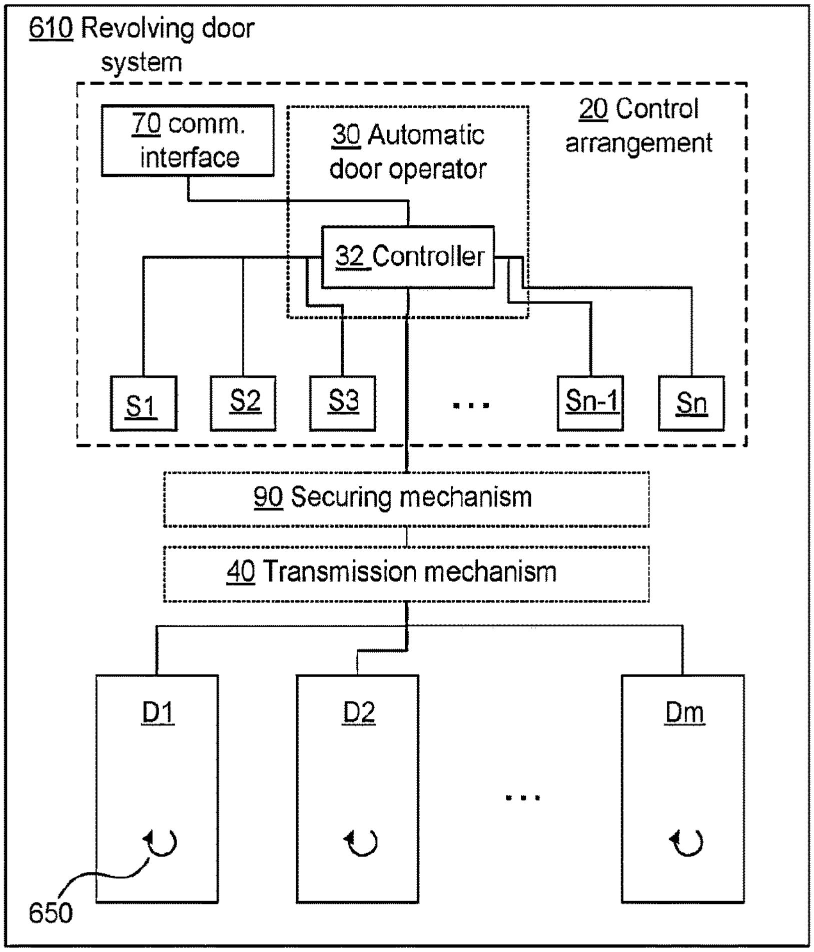
FIG. 1 is a schematic block diagram of a revolving door system according to the present invention.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the detailed description of the particular embodiments illustrated in the accompanying drawings is not intended to be limiting of the invention. In the drawings, like numbers refer to like elements.

FIG. 1 is a schematic block diagram illustrating a revolving door system independently in which the inventive aspect of the present invention may be applied. The revolving door system independently comprises a plurality of revolving door wings D1 . . . Dm, and an automatic door operator 30 for causing movements of the revolving door wings D1 . . . Dm between closed and open positions. In FIG. 1, a transmission mechanism 40 conveys mechanical power from the automatic door operator 30 to the revolving door wings D1 . . . Dm. The transmission mechanism 40 is connected to a central column of the revolving door system for transferring the rotation to the revolving door wings D1 . . . Dm.

The revolving door system 610 further comprises a securing mechanism 90 for selectively allowing pivoting of the revolving door wings D1 . . . Dm relative the central column of the revolving door system. The securing mechanism 90 is operatively connected to the control arrangement 20. The securing mechanism 90 will be further described and depicted with reference to FIG. 3*a-b*. The central column is rotatable and driven by means of the automatic door operator 30.

The control arrangement 20 may be configured to control the securing mechanism 90. The control arrangement 20 may thus be configured to selectively prompt the securing mechanism to go from the engaged state to the disengaged state.

As depicted in FIG. 1, the revolving door system 610 may comprise a communication interface 70. The communication interface 70 may be configured to receive and/or transmit data. The communication interface 70 may be a wired or wireless communication interface. The communication interface is operatively connected to the control arrangement 20 and preferably the controller 32. The communication interface 70 may be configured to receive and/or transmit data from a central control system and/or from other revolving door systems. The communication interface 70 may, for instance, be compliant with GSM, UMTS, LTE, D-AMPS, CDMA2000, FOMA, TD-SCDMA, TCP/IP, Ethernet, Bluetooth, WiFi (e.g. IEEE 802.11, wireless LAN), Near Field Communication (NFC), RF-ID (Radio Frequency Identification), Infrared Data Association (IrDA), without limitation and in any combination.

Figure 2:
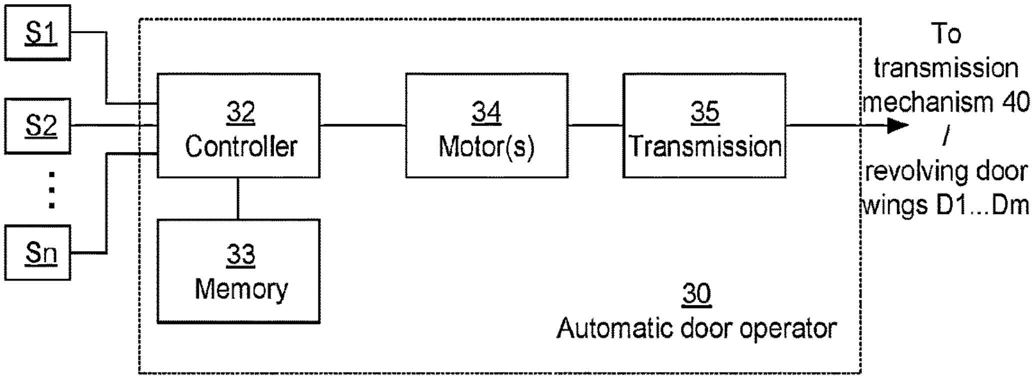
FIG. 2 is a schematic block diagram of an automatic door operator, which may be included in the revolving door system according to the present invention.

FIG. 2 illustrates one embodiment of the automatic door operator 30 of the revolving door system in further detail.

Pursuant to the invention, a control arrangement 20 is provided for the revolving door system independently. The control arrangement 20 comprises the controller 32, which may be part of the automatic door operator 30 as seen in the embodiment of FIG. 2, but which may be a separate device in other embodiments. The control arrangement 20 also comprises a plurality of sensors S1 . . . Sn. Each sensor is connected to the controller 32 by wired connections, wireless connections, or any combination thereof. As will be described further with reference to FIG. 3, each sensor is configured to monitor a respective zone Z1 . . . Zn at the revolving door system independently for presence or activity of a person or object. The person may be an individual who is present at the revolving door system independently, is approaching it or is departing from it. The object may, for instance, be an animal or an article in the vicinity of the revolving system independently, for instance brought by the aforementioned individual.

The embodiment of the automatic door operator 30 shown in FIG. 2 will now be described in more detail. The automatic door operator 30 may typically be arranged in conjunction with a frame or other structure which supports the revolving door wings D1 . . . Dm for movements between closed and open positions, often as a concealed overhead installation in or at the frame or support structure.

Preferably, the automatic door operator is comprised in the central column (depicted in FIGS. 3 to 4) around which the revolving door leafs are movably positioned.

In addition to the aforementioned controller 32, the automatic door operator 30 comprises a motor 34, typically an electrical motor, being connected to an internal transmission or gearbox 35. An output shaft of the transmission 35 rotates upon activation of the motor 34 and is connected to the transmission mechanism 40. The transmission mechanism translates the motion of the output shaft of the transmission 35 into the rotating motion of the revolving door wings D1 . . . Dm with respect to the frame or support structure.

The controller 32 is configured for performing different functions of the automatic door operator 30 in the different operational states of the revolving door system independently, using inter alia sensor input data from the plurality of sensors S1 . . . Sn. Hence, the outputs of the plurality of sensors S1 . . . Sn are connected to data inputs of the controller 32. At least some of the different functions performable by the controller 32 have the purpose of causing desired movements of the revolving door wings D1 . . . Dm. To this end, the controller 32 has at least one control output connected to the at least one motor 34 for controlling the actuation thereof.

The controller 32 may be implemented in any known controller technology, including but not limited to microcontroller, processor (e.g. PLC, CPU, DSP), FPGA, ASIC or any other suitable digital and/or analog circuitry capable of performing the intended functionality.

The controller 32 also has an associated memory 33. The memory 33 may be implemented in any known memory technology, including but not limited to E(E)PROM, S(D) RAM or flash memory. In some embodiments, the memory 33 may be integrated with or internal to the controller 32. The memory 33 may store program instruction for execution by the controller 32, as well as temporary and permanent data used by the controller 32.

Figure 3A:
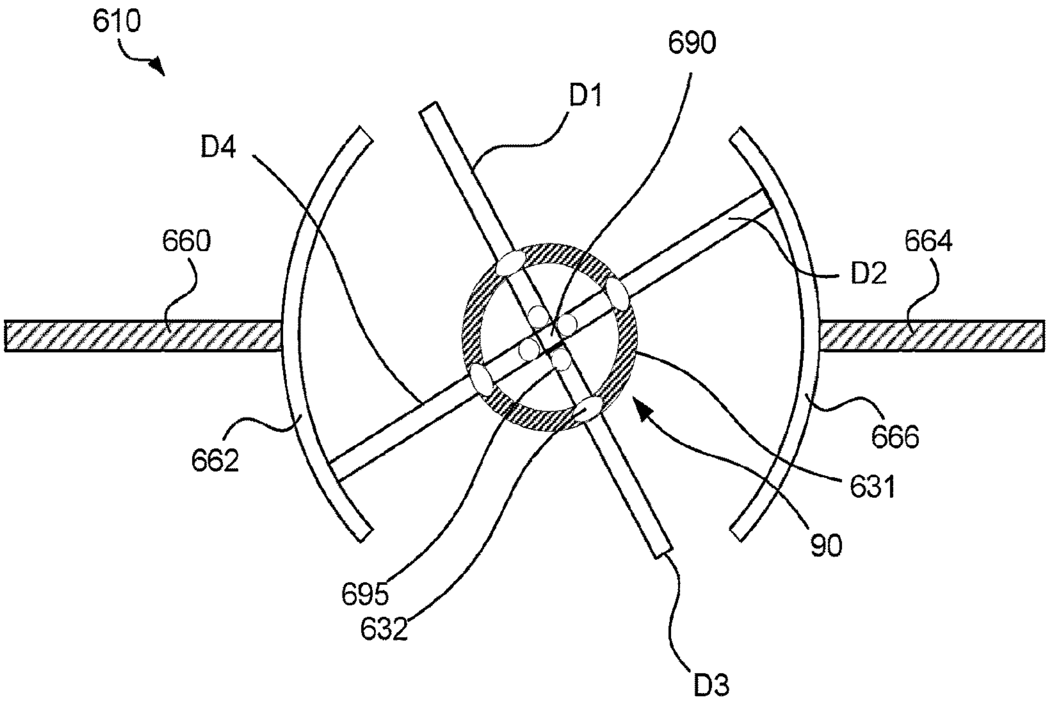
FIG. 3*a* depicts a schematic top view of a revolving door system according to an embodiment operating in a first mode.
Figure 3B:
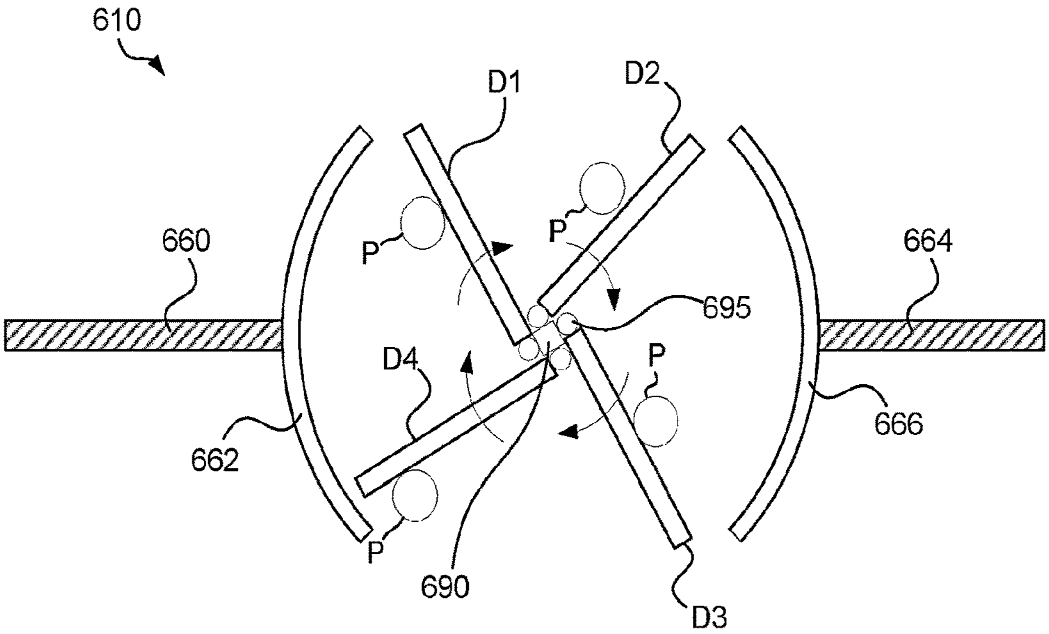
FIG. 3*b* depicts schematic top view of operation of a revolving door system according to an embodiment operating in a second mode.

The revolving door system independently is shown in a schematic top view in FIG. 3*a-b*. The plurality of revolving door wings of the revolving door system are pivotally connected to and arranged around a central column 690. The revolving door system independently thus comprises the plurality of revolving doors or revolving door wings D1-D4 being located in an essentially cylindrical space between first and second curved wall portions 662 and 666 which, in turn, are spaced apart and located between third and fourth wall portions 660 and 664.

As the skilled person recognizes, a revolving door system may comprise three, four or even more revolving door wings. Preferably, the revolving door system comprises three revolving door wings forming three compartments of the revolving door system or four revolving door wings forming four compartments of the revolving door system.

The revolving door wings D1-D4 are supported for rotational movement 650 in the cylindrical space between the first and second curved wall portions 662 and 666. During the rotation of the revolving door wings D1-D4, they will alternatingly prevent and allow passage through the cylindrical space. An automatic door operator (not seen in FIG. 3 but referred to as 30 in FIGS. 1 and 2) is configured to cause movement in the rotation direction 650 of the revolving door wings D1-D4 in a rotating state of the revolving door system between closed and opened positions.

Referencing FIG. 3*a* and FIG. 3*b*, a revolving door system according to an embodiment of the invention in a first and second mode is depicted.

The securing mechanism 90 of the revolving door system is depicted in the engaged state in FIG. 3*a*. In the engaged state, the securing mechanism 90 is arranged to fix the position of the revolving door wings D1, D2, D3, D4 relative the central column 690. Thus, in the engaged state, the revolving door wings D1, D2, D3, D4 are prevented to pivot relative the central column 690. Further in the engaged state, the revolving door wings D1, D2, D3, D4 are fix to the central column 690 allowing rotation of said door wings together with the central column 690.

In FIG. 4*b*, the securing mechanism 90 is disengaged and not shown. In the disengaged state, the securing mechanism 90 is arranged to enable pivoting of the revolving door wings D1, D2, D3, D4 relative the central column 690.

As the skilled person is aware, a securing mechanism according to the above may be achieved in multiple manners. In the depicted example, the securing mechanism 90 comprises at least one actuatable securing member 631. Each at least one actuatable securing member 631 is in the engaged state configured to lock at least one of the revolving door wings D1, D2, D3, D4 in position relative the central column 690.

Preferably, the securing member 631 is electromagnetically actuated. The securing member 631 may be spring-loaded to bias the securing member 631 towards a disengaged position in which the securing member 631 does not lock the revolving door wings in position. In an engaged position of the securing member 631, the securing member 631 engages at least one revolving door wing to fixate the position of said at least one revolving door wing relative the central column 690.

In the depicted example, the securing member 631 is an annular member arranged to in the engaged state of the securing mechanism 90 engage each of the revolving door wings D1, D2, D3, D4.

To enable activation of an emergency mode and achieving an escape route through the revolving door system, the control arrangement 20 is configured to cause switching from the first mode to the second mode at least based on sensor data obtained from at least one of the plurality of sensors (depicted in FIG. 2). The second mode may be thus be considered an emergency mode.

Thus an automatic manner of achieving an escape route in the revolving door system in an emergency situation is provided. With present revolving door system, a sensor is utilized to identify an emergency requiring activation of the emergency mode. Compared to relying on the revolving door becoming powerless or the manual activation of the emergency mode by means of an emergency switch, the emergency mode may be activated earlier and without requiring any knowledge of the emergency switch/button from the pedestrians in the vicinity of the revolving door system.

As depicted in FIG. 3*a*, each of the revolving door wings D1, D2, D3, D4 may be pivotally connected to the central column 690 by means of a pivot connection 695. The pivot connection 695 is adapted to enable pivoting of the revolving door wing relative the central column 690. The pivot connection 695 may be adapted to allow pivoting within an angular interval relative the central column 690. The pivot connection 695 may accordingly comprise a cam arrangement for guiding the pivoting movement of the revolving door wing relative the central column 690.

In FIG. 3*a*, the revolving door system 610 is operating in the first mode. Thus, the revolving door wings are fix to the rotatable central column 690.

As depicted in FIG. 3*b*, the disengaging of the securing mechanism allows for pivoting of the revolving door wings D1, D2, D3, D4 relative the central column 690. In the depicted example, a number of pedestrians P are present inside the revolving door system. The revolving door system 610 operates in the second mode. The revolving door wings D1, D2, D3, D4 are pivotable relative the central column 690. The pedestrians P pushes the revolving door wings forward, thus causing pivoting of the revolving door wings D1, D2, D3, D4 relative the central column 690. The pivoting of the revolving door wings D1, D2, D3, D4 may thus be performed manually and until said door wings reaches positions allowing for passage through the revolving door system.

Figure 4:
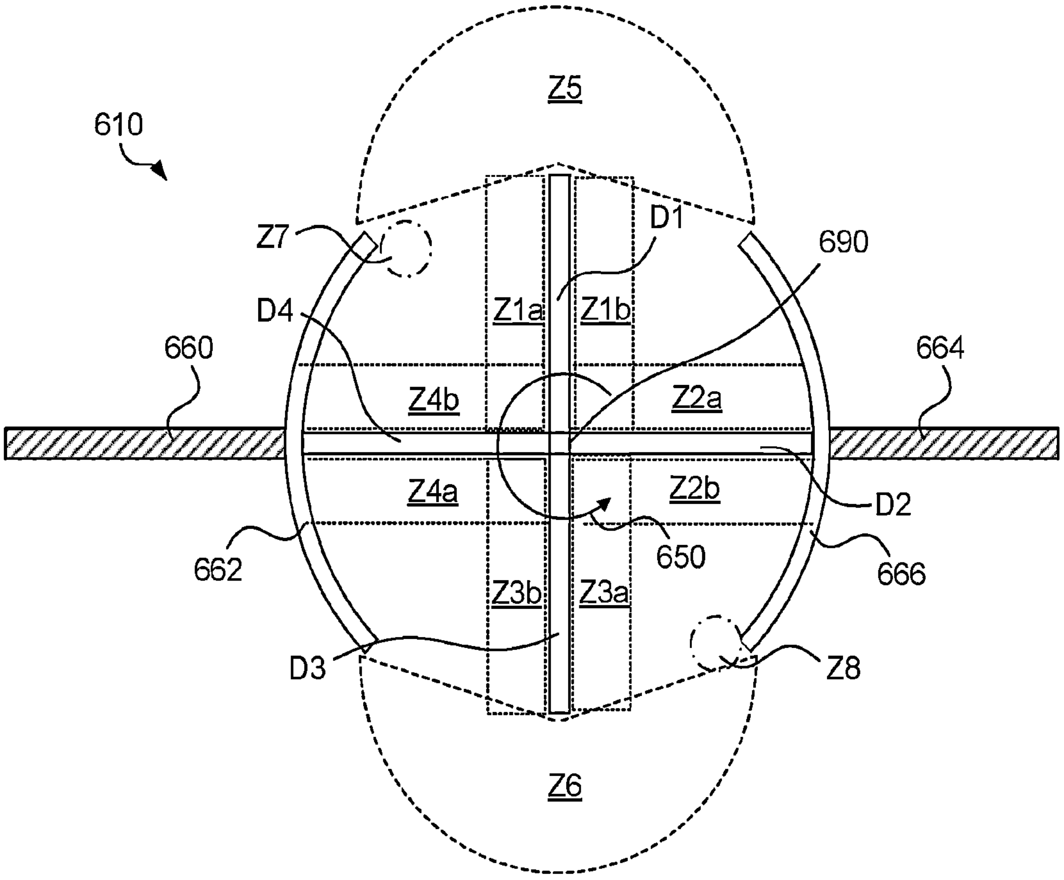
FIG. 4 is a schematic top view of a revolving door system with depicted sensor zones according to an embodiment.

Turning to FIG. 4, the revolving door system is depicted with sensor zones associated with the sensors for controlling the revolving door system and the activation of the second mode in particular.

Thus, the revolving door system may independently comprise a plurality of sensors, each monitoring a respective zone Z1-Z8. The sensors are comprised in the control arrangement. The sensors themselves are not shown in FIG. 4, but they are generally mounted at or near ceiling level and/or at positions which allow them to monitor their respective zones Z1-Z8. Again, each sensor will be referred to as Sx in the following, where x is the same number as in the zone Zx it monitors (Sx=S1-S8, Zx=Z1-Z8).

The plurality of door sensors may comprise door presence sensors S1, S2, S3, S4 for detecting when a person or object occupies a respective space near a respective revolving door wing D1, D2, D3, D4. The control arrangement may be configured to cause switching from the first mode to the second mode based on sensor data obtained from at least one of the door presence sensors. Thereby, the second mode may be automatically activated when the sensors detect a large number of pedestrians being present in the compartments between the revolving door wings or when an arbitrary number of pedestrians have been present inside said compartments for a long time.

The control arrangement may be configured to cause switching from the first mode to the second mode based on the sensor data indicating a person or object occupying a space adjacent to at least one revolving door wing D1, D2, D3, D4 for a time period exceeding a predefined time threshold value. The time threshold value may be considered an object presence threshold time TP. Preferably, the control arrangement may be configured to cause switching from the first mode to the second mode in response to the sensor data obtained from the door presence sensors indicating a person or object occupying a space adjacent to at least one revolving door wing D1, D2, D3, D4 for a time period exceeding a predefined time threshold value. Such control allows for relatively rapid identification of an emergency situation and subsequent activation of the second mode due to the system identifying pedestrians getting stuck inside the revolving door system.

Additionally or alternatively, the control arrangement may be configured to cause switching from the first mode to the second mode based on the sensor data indicating a number of persons or objects present in the respective space near the respective revolving door wings D1, D2, D3, D4 during a predefined time interval exceeding a predefined object number threshold value. The object number threshold value may be considered an object presence threshold amount AP. More preferably, the control arrangement may be configured to cause switching from the first mode to the second mode in response to sensor data obtained from the plurality door presence sensors indicating a number of persons or objects present in the respective spaces near the respective revolving door wings D1, D2, D3, D4 during a predefined time interval exceeding a predefined object number threshold value. During an emergency, relatively large numbers of pedestrians may gather inside the revolving door system, with the aforementioned functionality, such an emergency may be detected by the presence sensors.

To avoid collisions, the control arrangement may utilize sensor data from any one of the plurality of sensors to cause a stop of the revolving door wings. The control arrangement may when the revolving door system is in the rotating state and operates in the first mode be configured to cause a stop of the movement of the revolving door wings D1, D2, D3, D4, i.e. the revolving door wings D1, D2, D3, D4 and the central column 690, in response to a person or object occupying a space adjacent to a revolving door wing D1, D2, D3, D4 and in front of said revolving door wing D1, D2, D3, D4 relative the rotation direction 650. The stop may for example be caused by direct control of the motor of the revolving door system or by means of a brake assembly arranged to brake said movement of the revolving door wings.

The aforementioned functionality may be provided by the door presence sensors S1, S2, S3, S4 functioning as conventional door presence sensors utilized for avoiding collisions between objects and persons in the revolving door system and the revolving door wings. Alternatively, the sensors utilized to activate the second mode may be separate from the sensors for providing the aforementioned anti-collision functionality.

The control arrangement may thus when the revolving door system 610 is in the rotating state and operates in the first mode be configured to cause a stop of the movement of the revolving door wings D1, D2, D3, D4 in response to a person or object occupying a space adjacent to said revolving door wing D1, D2, D3, D4 and in front of said revolving door wing D1, D2, D3, D4 relative the rotation direction 650. In one embodiment, the control arrangement is configured to cause the stop based on sensor data obtained from the door presence sensors S1, S2, S3, S4.

Advantageously, the control arrangement is configured to cause switching from the first mode to the second mode in response to the stop of the movement of the revolving door wings D1, D2, D3, D4 exceeding a predefined time threshold value. The predefined threshold value may be considered a stop time threshold value TS. This allows for activation of the second mode even in cases where the sensor data is unreliable due to it being possible for the system to recognize the emergency situation by a non-characteristically lengthy stop of the revolving door system.

Accordingly, first to fourth sensors S1-S4, i.e. the door presence sensors, may be mounted at respective first to fourth central positons in FIG. 4 to monitor zones Z1-Z4. As previously described, the first to fourth sensors S1-S4 may further function as conventional door presence sensors, and the purpose is to detect when a person or object occupies a respective space (sub-zone of Z1-Z4) near the respective revolving door wing D1-D4 as it is being rotationally moved during a rotating state or start rotating state of the revolving door system independently. The provision of the door presence sensors S1-S4 may help avoiding a risk that the person or object will be hit by the approaching side of the respective revolving door D1-D4 and/or bejammed between the approaching side of the respective revolving door D1-D4 and end portions of the first or second curved wall portions 662 and 666. When any of the door presence sensors S1-S4 detects such a situation, it will trigger abort and possibly reversal of the ongoing rotational movement 650 of the revolving door wings D1-D4.

The door presence sensors S1-S4 may for instance be active IR (infrared) sensors. The door presence sensors S1-S4 may be arranged to move together with the respective revolving door wing. Thus, the door presence sensors S1-S4 may be mounted to the revolving door wings.

The door presence sensors S1-S4 are arranged to monitor a respective space near a respective revolving door wing D1-D4 for detecting when a person or object occupies said space. The space may be a zone Z1-Z4 adjacent each respective revolving door wing D1-D4. The zone Z1-Z4 may be divided into a front zone Z1*a*-Z4*a* and a rear zone Z1*b*-Z4*b*. The front zone is disposed in front of the revolving door wing D1-D4 relative the rotation direction 650. The rear zone is disposed behind the revolving door wing D1-D4 relative the rotation direction 650.

Accordingly, a first sensor S1 is arranged to monitor a space in the form of the zone Z1 adjacent to the first revolving door wing D1 which may be a first revolving door wing, the zone Z1 comprising the first front zone Z1*a* and the first rear zone Z1*b*.

A second sensor S2 is arranged to monitor a space in the form of the zone Z2 adjacent to the second revolving door wing D2 which may be a second revolving door wing, the zone Z2 comprising the second front zone Z2*a* and the second rear zone Z2*b*.

A third sensor S3 is arranged to monitor a space in the form of the zone Z3 adjacent to the third revolving door wing D3 which may be a third revolving door wing, the zone Z3 comprising the third front zone Z3*a* and the third rear zone Z3*b*.

A fourth sensor S4 is arranged to monitor a space in the form of the zone Z4 adjacent to the fourth revolving door wing D4 which may be a fourth revolving door wing, the zone Z4 comprising the fourth front zone Z4*a* and the fourth rear zone Z4*b*.

In one embodiment, the door presence sensor S1-S4 may comprise a single sensor unit arranged to monitor both the front zone Z1*a*-Z4*a* and the rear zone Z1*b*-Z4*b*. In one embodiment, the door presence sensor S1-S4 may comprise a first and second sensor unit. The first sensor unit may be arranged to monitor the front zone Z1*a*-Z4*a* and the second sensor unit may be arranged to monitor the rear zone Z1*b*-Z4*b*.

Further referencing FIG. 4, the plurality of sensors may comprise at least one activity sensor S5, S6 for detecting when a person or object approaches the revolving door system 610. The control arrangement may be configured to cause switching from the first mode to the second mode based on sensor data obtained from at least one of the activity sensors S5, S6. Thus, the revolving door system may recognize an emergency situation by identifying a non-characteristically large number of pedestrians approaching the revolving door system.

Advantageously, the control arrangement is configured to cause switching from the first mode to the second mode based on the sensor data indicating a number of persons or objects approaching the revolving door system 610 during a predefined time interval exceeding a predefined object number threshold value. The object number threshold value may be considered an approaching object presence threshold amount AAP. As depicted in FIG. 4, a first activity sensor in the form of the fifth sensor S5 is mounted at an inner non-central positon in FIG. 3 to monitor zone Z5. The fifth sensor S5 may be a conventional inner activity sensor, and the purpose is to detect when a person or object approaches the revolving door system independently from the inside of the premises. The provision of the inner activity sensor S5 will trigger the revolving door system independently, when being in a no rotating state or an end rotating state, to automatically switch to a start rotating state to begin rotating the revolving door wings D1-D4, and then make another switch to a rotating state when the revolving door wings D1-D4 have reached full rotational speed.

A second activity sensor in the form of the sixth sensor S6 is mounted at an outer non-central positon in FIG. 3 to monitor zone Z6. The sixth sensor S6 may be a conventional outer activity sensor, and the purpose is to detect when a person or object approaches the revolving door system independently from the outside of the premises. Similar to the inner activity sensor S5, the provision of the outer activity sensor S6 will trigger the revolving door system independently, when being in its no rotating state or end rotating state, to automatically switch to the start rotating state to begin rotating the revolving door wings D1-D4, and then make another switch to the rotating state when the revolving door wings D1-D4 have reached full rotational speed.

The inner activity sensor S5 and the outer activity sensor S6 may for instance be radar (microwave) sensors. Alternatively, said activity sensors may be image-based sensors such as cameras.

In one embodiment, the plurality of sensors may comprise at least one sensor configured to obtain the speed of a person or object approaching and/or moving through the revolving door system 610. The control arrangement is configured to cause switching from the first mode to the second mode based on sensor data obtained from the at least one sensor. In one embodiment, the presence sensors and/or activity sensors may be configured to obtain said speed. In one embodiment, separate sensors, such as cameras, may be provided for obtaining said speed. Thus, the sensors may identify an emergency ny identifying pedestrians approaching and moving through the revolving door system at a higher speed than normal.

Accordingly, the control arrangement may be configured to cause switching from the first mode to the second mode based on the sensor data indicating a speed of the person or object approaching and/or moving through the revolving door system 610 exceeding a predefined object speed threshold value. The object speed threshold value may be considered object speed threshold value SO.

Further, referencing FIG. 4, the seventh and eighth sensors S7 and S8 are mounted near the ends of the first or second curved wall portions 662 and 666 to monitor zones Z7 and Z8. The seventh and eighth sensors S7 and S8 are vertical presence sensors. The provision of these sensors S7 and S8 will help avoiding a risk that the person or object will be jammed between the approaching side of the respective revolving door wing D1-D4 and an end portion of the first or second curved wall portions 662 and 666 during the start rotating state and the rotating state of the revolving door system independently. When any of the vertical presence sensors S7-S8 detects such a situation, it will trigger abort and possibly reversal of the ongoing rotational movement of the revolving door wings D1-D4.

The vertical presence sensors S7-S8 may for instance be active IR (infrared) sensors.

Preferably, the control arrangement may be configured to cause the switching to the second mode based on a combination of all of the above described parameters and conditions. Hence, as the skilled person realizes, numerous thresholds may be utilized for setting up the sensors for identifying an emergency.

The requirements and the operating conditions for the revolving door system may vary greatly depending on where it is installed. Thus, the revolving door system according to the invention may implement a training function in order to more accurately identify a situation requiring the activation of the second mode. The control arrangement may thus take previous operational data into consideration in the control of the switching from the first mode to the second mode. In one embodiment, the control arrangement is configured to cause switching from the first mode to the second mode based on a combination of the sensor data obtained from at least one of the plurality of sensors and historical operational data of the revolving door system. Thereby, a more precise activation of the second mode may be achieved.

For example, in a revolving door system installed in a relatively calm environment with only a few pedestrians each hour, the thresholds for identifying a present situation as an emergence can be lower compared to a revolving door system which is very heavily trafficked. Also, in some cases the traffic through the revolving door system may vary greatly during the day. A spike in the traffic at a non-characteristic time of the day may thus be indicative of an emergency. Therefore, the control arrangement may be trained to lower the thresholds for detecting the emergency during certain times etc. The training, i.e. control based on the historical operational data, allows for the control arrangement to adapt the control based on the characteristic operational pattern of the revolving door system and switch to the second mode based on a detected deviation from said characteristic operational pattern.

Advantageously, the control arrangement is configured to adjust a preset or reference predefined object number threshold value, predefined object speed threshold value, predefined time interval and/or predefined threshold value based on the historical operational data of the revolving door system 610. The preset predefined value(s) may be stored in the memory described with reference to FIG. 2. For example, the revolving door system may be installed with such preset values which then may be adjusted based on the historical operational data originating from the operation of the revolving door system.

The historical sensor data may comprise any data chosen from the group: historical sensor data obtained from the plurality of sensors S1 . . . Sn and number of previous activations of the first and/or second mode during a set time period.

Preferably, the historical operational data is in the form historical operational parameters of the revolving door system 610.

The historical operational data may comprise any data chosen from the group: the time period a person has been present in a space adjacent to at least one revolving door wing D1, D2, D3, D4, number of objects or persons which has been present in the respective spaces near the respective revolving door wings D1, D2, D3, D4 during a set time period, number of persons or objects which has been approaching the revolving door system 610 during a set time period, the speed of objects or persons approaching or moving through the revolving door system 610 during a set time period, number of stops of the movement of the revolving door wings D1, D2, D3, D4 during a set time period and/or the elapsed time for each of stop of the movement of the revolving door wing during a set time period.

The control arrangement may thus be configured to adapt the predefined number of persons or objects, speed, and/or predefined time interval based on the historical operational data of the revolving door system 610.

In one embodiment, the control arrangement may be configured to cause switching from the first mode to the second mode based on a combination of sensor data obtained from at least one of the plurality of sensors and historical sensor data obtained from other revolving door systems.

According to an aspect, a revolving door system arrangement may be provided. The revolving door system arrangement may comprise a plurality of revolving door systems according to the above described embodiments. Each of the plurality of revolving door systems may comprise the communication interface (depicted in FIG. 1). The communication interfaces are configured to operatively connect the plurality of revolving door systems. The communication interfaces may be configured to receive historical operational data and/or sensor data from any one of the remaining revolving door systems. The control arrangement of one of the revolving door systems may be configured to cause switching from the first mode to the second mode based on historical operational data of any one of the remaining revolving door systems and/or sensor data obtained from any one of the remaining revolving door systems. Preferably, multiple revolving door systems installed in a building may be in communication via said communication interfaces, whereby the training of the detection of an emergency may be performed based on gathered operational data from each revolving door system in the building.

Figure 5:
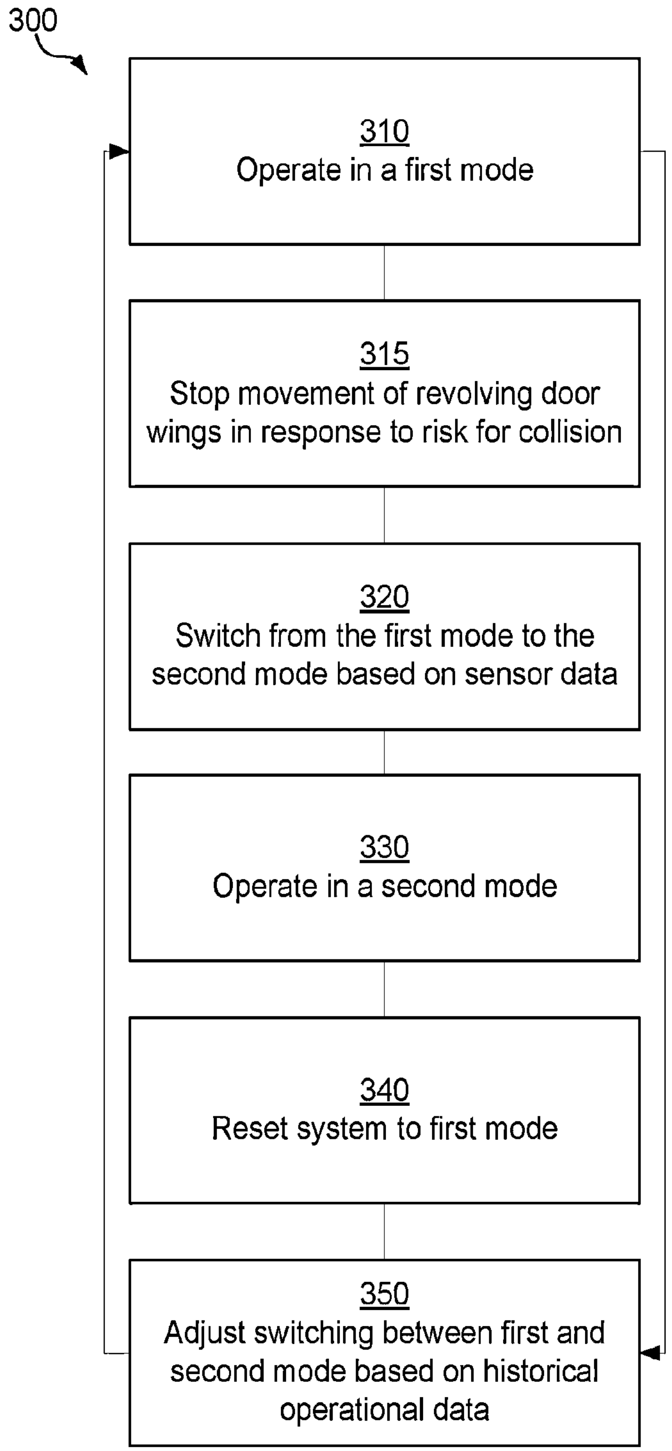
FIG. 5 schematically depicts a method for controlling a revolving door system according to an embodiment.

Turning to FIG. 5, a method for controlling a revolving door system is provided. As previously described with reference to FIG. 1 to 5, the revolving door system comprises a plurality of revolving door wings. The revolving door wings are pivotally connected to and arranged around a central column. The revolving door system further comprises a control arrangement. The control arrangement comprises an automatic door operator configured to cause movement of the revolving door wings in a rotation direction in a rotating state of the revolving door system between closed and opened positions. The control arrangement further comprises a controller and a plurality of sensors. Each sensor is connected to the controller and is configured to monitor a respective zone at the revolving door system for presence or activity of a person or object. The revolving door system comprises a securing mechanism operatively connected to the control arrangement arranged to in an engaged state fix the position of the revolving door wings relative the central column and in a disengaged state release the revolving door wings to enable pivoting of said revolving door wings relative the central column. The revolving door system may be the revolving door system described with reference to FIG. 1 to 4.

Again referencing FIG. 5, the method comprises operating in a first mode 310 of the revolving door system in which the securing mechanism is in the engaged state and switching 320 from the first mode of the revolving door system to a second mode in which the securing mechanism is in the disengaged state. The switching from the first mode to the second is at least based on sensor data obtained from at least one of the plurality of sensors.

Accordingly, the method comprises to obtain sensor data obtained from said sensors. The method may further comprise in response to said sensor data indicating that a person or object occupies a space or zone at the revolving door system control the switching from the first mode to the second mode.

During operation in the second mode 330, the revolving door system may be reset 340 to the first mode. This is achieved by positioning of the revolving door wings at their set positions relative the central column and actuation of the securing mechanism to the engaged state. This may be performed manually by an operator pushing the door wings to their intended positions and thereafter activating a switch for actuating the securing mechanism.

In one embodiment, the switching 320 from the first mode to the second mode is based, i.e. at least partly based, on the sensor data, i.e. sensor data obtained from the plurality of sensors, indicating a person or object occupying a space adjacent to at least one revolving door wing for a time period exceeding a predefined time threshold value.

In one embodiment, the switching 320 from the first mode to the second mode is based, i.e. at least partly based, on the sensor data, i.e. sensor data obtained from the plurality of sensors, indicating a number of persons or objects present in the respective spaces near the respective revolving door wings during a predefined time interval exceeding a predefined object number threshold value.

Preferably, the method may further comprise stopping 315 the movement of the revolving door wings, i.e. the revolving door wings and central column, in response to a person or object occupying a space adjacent to a revolving door wing and in front of said revolving door wing relative the rotation direction when the revolving door system is in the rotating state and operates in the first mode. The switching 320 from the first mode to the second mode may be performed in response to the movement of the revolving door wings having been stopped for a time period exceeding predefined time threshold value.

In one embodiment, the switching 320 from the first mode to the second mode may be performed in response to sensor data, i.e. sensor data obtained from the plurality of sensors, indicating a number of persons or objects approaching the revolving door system during a predefined time interval exceeding a predefined object number threshold value.

In one embodiment, the switching 320 from the first mode to the second mode may be performed based, i.e. at least partly based, on the sensor data, i.e. sensor data obtained from the plurality of sensors, indicating a speed of a person or object approaching and/or moving through the revolving door system exceeding a predefined object speed threshold value. At least one of the sensors of the plurality of sensors may accordingly be configured to obtain said speed.

In one embodiment, the switching 320 from the first mode to the second mode may be based, i.e. at least partly based, on a combination of the sensor data obtained from at least one of the plurality of sensors and historical operational data of the revolving door system. Preferably, the method may comprise adjusting 350 a preset predefined object number threshold value, predefined object speed threshold value, predefined time interval and/or predefined threshold value based on the historical operational data of the revolving door system.

The invention has been described above in detail with reference to embodiments thereof. However, as is readily understood by those skilled in the art, other embodiments are equally possible within the scope of the present invention, as defined by the appended claims.

The invention claimed is:

1. A revolving door system comprising:

a plurality of revolving door wings pivotally connected to and arranged around a central column, a control arrangement comprising an automatic door operator configured to cause movement of the revolving door wings in a rotation direction in a rotating state of the revolving door system between closed and opened positions, a controller and a plurality of sensors, each sensor being connected to the controller and being configured to monitor a respective zone at the revolving door system for presence or activity of a person or object, a securing mechanism operatively connected to the control arrangement arranged to, in an engaged state, fix a position of the revolving door wings relative the central column and, in a disengaged state, release the revolving door wings to enable pivoting of said revolving door wings relative the central column, wherein the revolving door system is configured to operate in a first mode wherein the securing mechanism is in the engaged state and a second mode wherein the securing mechanism is in the disengaged state, wherein, when the revolving door system is in the rotating state and operates in the first mode, the control arrangement is configured to cause a stop of the movement of the revolving door wings in response to a person or object occupying a space adjacent to one of the plurality of revolving door wings and in front of said one revolving door wing relative to the rotation direction, wherein the control arrangement is configured to cause switching from the first mode to the second mode at least based on sensor data obtained from at least one of the plurality of sensors and in response to the stop of the movement of the revolving door wings exceeding a predefined time threshold value.

2. The revolving door system according to claim 1, wherein the plurality of sensors comprises a plurality of door presence sensors for detecting when a person or object occupies a respective space near a respective revolving door wing, whereby the control arrangement is configured to cause switching from the first mode to the second mode based on sensor data obtained from at least one of the door presence sensors.

3. The revolving door system according to claim 1, wherein the plurality of sensors comprises at least one activity sensor for detecting when a person or object approaches the revolving door system, whereby the control arrangement is configured to cause switching from the first mode to the second mode based on sensor data obtained from at least one of the activity sensors.

4. The revolving door system according to claim 3, wherein the control arrangement is configured to cause switching from the first mode to the second mode based on the sensor data indicating a number of persons or objects approaching the revolving door system during a predefined time interval exceeding a predefined object number threshold value.

5. The revolving door system according to claim 1, wherein at least one of the plurality of sensors is configured to obtain the speed of a person or object approaching and/or moving through the revolving door system, whereby the control arrangement is configured to cause switching from the first mode to the second mode based on sensor data obtained from said at least one of the plurality of sensors.

6. The revolving door system according to claim 5, wherein the control arrangement is configured to cause switching from the first mode to the second mode based on the sensor data indicating a speed of the person or object approaching and/or moving through the revolving door system exceeding a predefined object speed threshold value.

7. The revolving door system according to claim 1, wherein the control arrangement is configured to cause switching from the first mode to the second mode based on a combination of the sensor data obtained from at least one of the plurality of sensors and historical operational data of the revolving door system.

8. The revolving door system according to claim 7, wherein the control arrangement is configured to adjust a preset predefined object number threshold value, predefined object speed threshold value, predefined time interval and/or predefined time threshold value based on the historical operational data of the revolving door system.

9. The revolving door system according to claim 7, wherein the historical operational data comprise any data chosen from the group: historical sensor data obtained from the plurality of sensors and number of previous activations of the first and/or second mode during a set time period.

10. A revolving door system arrangement comprising a plurality of revolving door systems according to claim 1, wherein each of the plurality of revolving door systems comprises a communication interface configured to receive historical operational data and/or sensor data from any other one of the plurality of revolving door systems, whereby the control arrangement of a first one of the plurality of revolving door systems is configured to cause switching from the first mode to the second mode based on said historical operational data of any one of the plurality of revolving door systems and/or said sensor data obtained from any other one of the plurality of revolving door systems.

11. A revolving door system comprising:

a plurality of revolving door wings pivotally connected to and arranged around a central column, a control arrangement comprising an automatic door operator configured to cause movement of the revolving door wings in a rotation direction in a rotating state of the revolving door system between closed and opened positions, a controller and a plurality of sensors, each sensor being connected to the controller and being configured to monitor a respective zone at the revolving door system for presence or activity of a person or object, a securing mechanism operatively connected to the control arrangement arranged to, in an engaged state, fix the position of the revolving door wings relative the central column and, in a disengaged state, release the revolving door wings to enable pivoting of said revolving door wings relative the central column, wherein the revolving door system is configured to operate in a first mode wherein the securing mechanism is in the engaged state and a second mode wherein the securing mechanism is in the disengaged state, wherein the control arrangement is configured to cause switching from the first mode to the second mode at least based on sensor data obtained from at least one of the plurality of sensors, wherein the plurality of sensors comprises a plurality of door presence sensors for detecting when a person or object occupies a respective space near a respective revolving door wing, whereby the control arrangement is configured to cause switching from the first mode to the second mode based on sensor data obtained from at least one of the door presence sensors, wherein the control arrangement is configured to cause switching from the first mode to the second mode based on the sensor data indicating a number of persons or objects present in the respective spaces near the respective revolving door wings during a predefined time interval exceeding a predefined object number threshold value.

12. A method for controlling a revolving door system, the revolving door system comprising a plurality of revolving door wings pivotally connected to and arranged around a central column and a control arrangement, the control arrangement comprising an automatic door operator configured to cause movement of the revolving door wings in a rotation direction in a rotating state of the revolving door system between closed and opened positions, a controller and a plurality of sensors each sensor being connected to the controller and being configured to monitor a respective zone at the revolving door system for presence or activity of a person or object, the revolving door system further comprises a securing mechanism operatively connected to the control arrangement arranged to, in an engaged state, fix a position of the revolving door wings relative the central column and, in a disengaged state, release the revolving door wings to enable pivoting of said revolving door wings relative the central column, the method comprising:

operating in a first mode of the revolving door system in which the securing mechanism is in the engaged state, stopping the movement of the revolving door wings in response to a person or object occupying a space adjacent to a revolving door wing and in front of said revolving door wing relative the rotation direction when the revolving door system is in the rotating state and operates in the first mode, and switching from the first mode of the revolving door system to a second mode of the revolving door system in which the securing mechanism is in the disengaged state, wherein the switching from said first mode to said second mode is at least based on sensor data obtained from at least one of the plurality of sensors and the movement of the revolving door wings having been stopped for a time period exceeding a predefined time threshold value.

13. The method according to claim 12, further comprising switching from the first mode to the second mode based on the sensor data indicating a person or object occupying a space adjacent to at least one revolving door wing for a time period exceeding a further predefined time threshold value.

14. The method according to claim 12, further comprising switching from the first mode to the second mode based on the sensor data indicating a number of persons or objects present in the respective spaces near the respective revolving door wings during a predefined time interval exceeding a predefined object number threshold value.

15. The method according to claim 12, further comprising switching from the first mode to the second mode based on the sensor data indicating a speed of a person or object approaching and/or moving through the revolving door system exceeding a predefined object speed threshold value.

16. The method according to claim 12, further comprising switching from the first mode to the second mode based on a combination of the sensor data obtained from at least one of the plurality of sensors and historical operational data of the revolving door system.

17. The method according to claim 16, further comprising adjusting a preset predefined object number threshold value, predefined object speed threshold value, predefined time interval and/or predefined time threshold value based on the historical operational data of the revolving door system.

* * * * *